United States Patent
Deiringer

Patent Number: 5,225,130
Date of Patent: Jul. 6, 1993

[54] PROCESS FOR RECLAIMING THERMALLY STRAINED POLYESTER SCRAP MATERIAL

[75] Inventor: Guenther Deiringer, Kastl, Fed. Rep. of Germany

[73] Assignee: Hoechst Aktiengesellschaft, Frankfurt am Main, Fed. Rep. of Germany

[21] Appl. No.: 783,699

[22] Filed: Oct. 30, 1991

[30] Foreign Application Priority Data

Oct. 30, 1990 [DE] Fed. Rep. of Germany ....... 4034459

[51] Int. Cl.⁵ .................. B29B 17/00; B29C 47/76
[52] U.S. Cl. .................................. 264/102; 264/37; 264/85; 264/169; 264/140; 264/211.24; 264/DIG. 69; 425/185
[58] Field of Search ............... 264/169, 37, DIG. 69, 264/140, 101, 102, 85, 211.23, 211.24; 425/202, 203, 205, 183, 185, 197

[56] References Cited

U.S. PATENT DOCUMENTS

| | | | |
|---|---|---|---|
| 3,344,091 | 9/1967 | Russin et al. | 260/2.3 |
| 3,389,203 | 6/1968 | Merges et al. | 264/140 |
| 3,585,259 | 6/1971 | Lefferts et al. | 264/85 |
| 4,064,079 | 12/1977 | Sidebotham et al. | 264/37 |
| 4,092,458 | 5/1978 | Hoffman | 264/140 |
| 4,756,858 | 7/1988 | Reifenhäuser et al. | 264/37 |
| 4,958,006 | 9/1990 | Bernier et al. | 264/211.23 |
| 5,102,594 | 4/1992 | Burlet et al. | 425/205 |

FOREIGN PATENT DOCUMENTS

| | | | |
|---|---|---|---|
| 1454875 | 2/1969 | Fed. Rep. of Germany . | |
| 3433791 | 3/1986 | Fed. Rep. of Germany | 264/140 |
| 55-2031 | 1/1980 | Japan | 264/169 |
| 57-31529 | 2/1982 | Japan | 264/140 |
| 2130124A | 5/1984 | United Kingdom | 264/37 |

Primary Examiner—Jeffery Thurlow
Attorney, Agent, or Firm—Foley & Lardner

[57] ABSTRACT

Reclaiming of polyester waste material for re-use in the production of high-quality PET plastic material comprises shredding, cleaning, sorting and postcondensing said waste materials. The shredded scrap material comprises polyester waste materials of various molecular weights and degrees of purifying. The shredded material is molten and filtered The filtered melt is either post-condensed in the molten state and then granulated or is first granulated and then subjected to a solid phase post-condensation. The granules obtained in each case are preferably fed into an extruder and extruded together with virgin raw material so as to produce a useful film or article.

24 Claims, 1 Drawing Sheet

PROCESS FOR RECLAIMING THERMALLY STRAINED POLYESTER SCRAP MATERIAL

BACKGROUND OF THE INVENTION

The present invention relates to a process for reclaiming thermally strained polyester scrap material. The reclaimed material can be used, e.g, in the production of high-quality polyethylene terephthalate plastic articles. The process comprises shredding, purifying, and sorting the polyester scrap material during its reclaiming.

Today, it is no longer the sole object of the manufacturer to produce goods. To an increasing extent, the manufacturer is expected to provide for the disposal of its products after use as well. In connection with the reclaiming of plastic materials, an essential problem resides, because the plastics are partially degraded during their processing into commodity articles. Due to the fact that the used materials possess inferior optical and mechanical properties, it is, in general, not possible to use them again in the production of goods having the same good quality as the initial products.

German Offenlegungsschrift No. 34 33 791 discloses a process for producing plastic granules which are suitable for thermoplastic processing in an extruder, from scrap material obtained in the course of the extrusion of thermoplastic materials. The process comprises first cutting and optionally drying the material, then densifying the cut material, and finally comminuting the material into pellets which can be fed to the extruder. This known process is directed to the reclaiming of scrap material of a specific polymer, i.e., one whose mechanical, optical, and chemical properties are unchanged compared to the initial processing.

A process for the recovery of densified material from plastic films or plastic film scrap material is known from German Auslegeschrift No. 14 54 875. In this process, the films are first comminuted, then densified in an agglomeration apparatus, and transported by means of a blower equipped with a conveying line and an air separator, whereupon the densified material is comminuted in a cutting mill, to give pellets having approximately the size of the granules of the polymer raw material.

U.S. Pat. No. 3,344,091 is directed to a process for converting scrap polyester, wherein the scrap is comminuted to a certain particle size, mixed with an aromatic dicarboxylic acid ester and glycol, and heated to a temperature 25° to 50° C. above the boiling point of the glycol. After dissolution of the polyester and removal of the alcohol, a prepolycondensate having an average degree of polycondensation of less than 10 is obtained, which upon further heating is converted into a powder. This powder is subjected to a solid phase polycondensation process in an inert gas atmosphere. The process is based on a two-step procedure, the first step comprising the degradation of the scrap polymer into a low-molecular product, and the second step comprising the polycondensation of said low-molecular product to give a high-molecular product.

Like the process described above, this two-step process comprising a dissolution or degradation step and a condensation step is mainly directed to the post-condensation of scrap material of one single polymer having a specific degree of polycondensation. It is not intended to treat polymer scrap materials having different molecular weights in one process cycle.

SUMMARY OF THE INVENTION

It is an object of the invention to provide an improved process for reclaiming both high and low molecular weight polyester waste material, such that the procedure is simplified and economical.

It is further an object of the invention to provide reclaimed polyesters produced by the above processes and to provide a use for such polyesters, such as in multilayer films.

In accomplishing the foregoing objective, there has been provided, in accordance with one aspect of the invention, a process for reclaiming thermally strained polyester waste material comprising the steps of:

a) shredding a mixture of polyester waste materials, the mixture comprising polyesters of different molecular weights and different degrees of conversion, so as to form a shredded polyester mixture, b) melting the shredded mixture so as to form a molten material, c) optionally filtering the molten material so as to remove impurities having a particle size of equal to/greater than about 5 to 10 microns, so as to produce a filtered melt, d) increasing by about 12 to about 150% as compared to the initial molecular weight of the filtered melt, the average molecular weight of the filtered melt, by post-condensation so as to produce a condensed mixture, e) granulating the condensed mixture, so as to produce a granulated mixture, and f) optionally feeding the granulated mixture to an extruder and extruding it together with virgin polyester so as to produce an extruded article.

In accordance with another object of the invention there has been provided an additional process for reclaiming thermally strained polyester waste material comprising the steps of:

a) shredding a mixture of polyester waste material, the mixture comprising polyesters of different molecular weights and different degrees of conversion, so as to form a shredded polyester mixture, b) melting the shredded mixture so as to form a molten material, c) optionally filtering the molten material so as to remove impurities having a particle size of equal to/greater than about 5 to 10 microns, so as to produce a filtered melt, d) solidifying the filtered melt, so as to produce a solidified mixture, e) granulating the solidified mixture so as to produce a granulated mixture, f) increasing by about 30 to about 150%, as compared to the initial molecular weight, the average molecular weight of the granulated mixture, by solid phase post-condensation so as to produce a condensed granulated mixture, and g) optionally feeding the condensed granulated mixture to an extruder and extruding it together with virgin polyester so as to produce an extruded article.

In accordance with another object of the invention there has been provided an article, such as a film, comprising the polyester reclaimed by either of the above methods.

BRIEF DESCRIPTION OF THE DRAWING

The FIGURE is a flow chart illustrating the process of the invention.

DETAILED DESCRIPTION OF THE INVENTION

Figure 1:
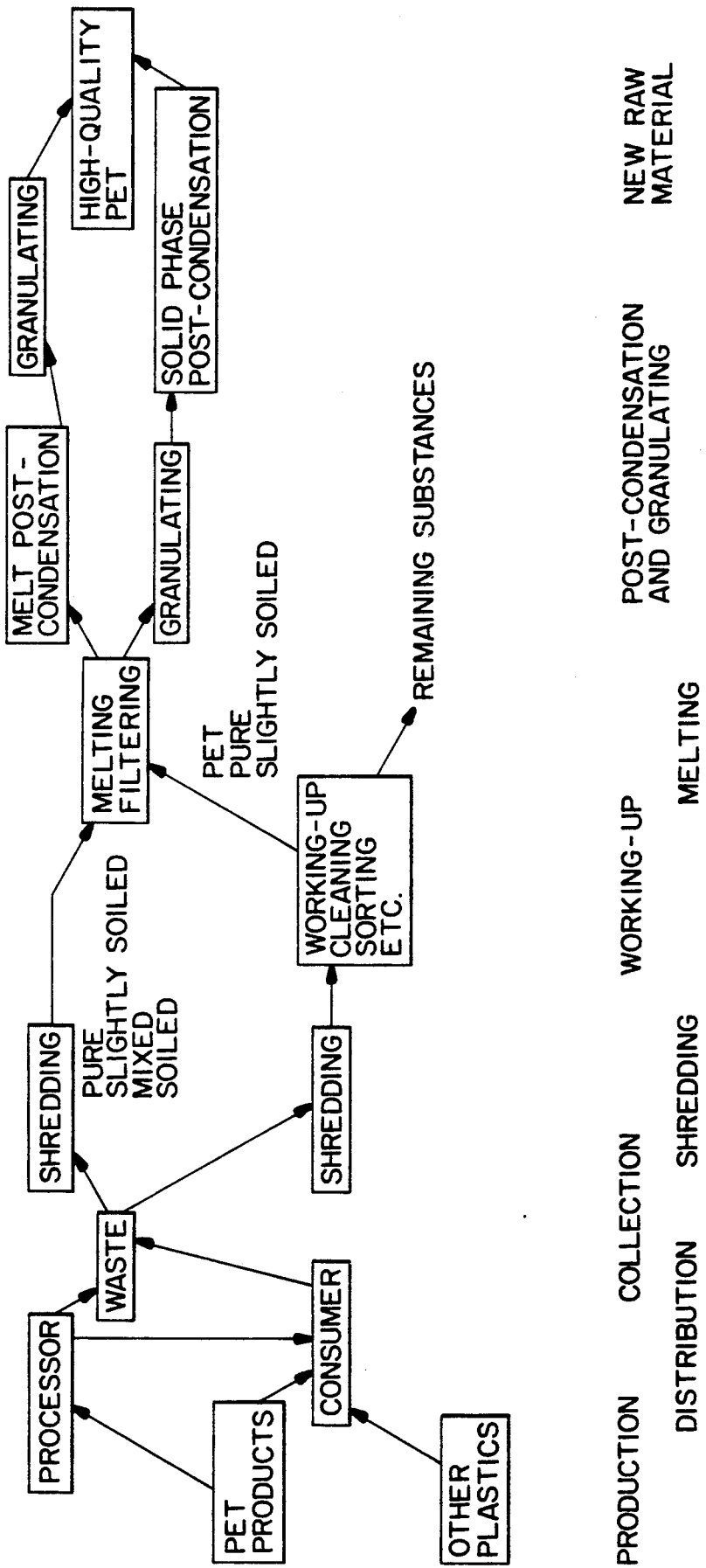

Among the most widely spread plastic materials polyethylene, polypropylene, polystyrene, polyvinyl chloride, and polyethylene terephthalate, only the polycondensates, i.e., polyethylene terephthalate generally offer the possibility of reversing the degradation occurring as a result of the production process and use of the finished articles, by means of a defined process step.

The individual polyester products subject to reclaiming by the instant invention, such as fibers, containers, amorphous and biaxially oriented polyethylene terephthalate films, generally have different molecular weights, different additive contents and, in particular in the case of biaxially oriented PET films, different surface coatings. These products are in general prepared from thermoplastic polyesters, whereby the polyester raw materials, in particular those employed for producing films, comprise polyester homopolymers and copolymers, blends of several polyesters, and also blends of polyesters and other polymers.

Polyesters can be produced according to the transesterification process using known catalysts, such as salts of Zn, Ca, Mn, Li, or Ge, or according to the direct esterification process. Examples of suitable polyesters for use in the instant process include polyethylene terephthalate (PET), polytetramethylene terephthalate, poly-1,4-cyclohexylenedimethyl terephthalate, and polyethylene-2,6-naphthalate. PET is a preferred polyester.

The structural units contained in the copolyesters are preferably adipic acid, sebacic acid, phthalic acid, isophthalic acid, and/or sulfo-isophthalic acid.

Various polymers can be blended in with the polyester subjected to reclaiming. Specific examples of polymers which may be worked into the polyester, include, but are not limited to, polyolefin homopolymers or polyolefin copolymers, such as polypropylene, and poly-4-methyl-pentene; ethylene/vinyl acetate copolymers, which in turn may be hydrolyzed; ionomers; polyamides; polycarbonates; and flourine-containing polymers.

Whereas the rather low molecular weight products, such as fibers and biaxially oriented PET films, possess the highest degree of purifying and normally cannot tolerate an admixture of reclaimed material, the amorphous PET films comprise high-molecular weight polyethylene terephthalates. The low molecular weight PET constitute the major amount of polyethylene terephthalates processed in industry. For example, the amount of biaxially oriented PET films sold is about 12 times as high as the amount of amorphous PET films sold. Thus, there is an excess supply of low-molecular weight scrap PET. Such PET can be reclaimed by the process of the invention.

As a result of the post-condensation step used in the present application, the molecular weight or degree of polycondensation of the low-molecular polyester scrap material, such as scrap from biaxially oriented PET films, is increased to the molecular weight of the high-molecular scrap material, e.g., scrap from amorphous PET films, so that the reclaimed scrap material can be used for the production of new products from high-molecular weight plastic materials.

The concept of the reclaiming process is based on the post-condensation step, which in principle is known as an obligatory procedure in the production of high-molecular weight virgin raw material for polyester products.

An essential advantage offered by the processes of this invention resides in the fact that polyester scrap material resulting from different products can be processed and re-used, and that simultaneously the usual impairment of the mechanical and optical properties can be to a great extent reversed by the post-condensation step. It is possible to process scrap material from products comprised of low-molecular weight plastics, such as fibers and biaxially oriented PET films, i.e., scrap material from products which cannot be produced with an admixture of reclaimed material, to give products comprised of high-molecular weight plastics, which due to their greater thickness and lower degree of purifying are less sensitive to minimal impurities.

The process of the invention will be described in more detail below, with reference to the FIGURE. The diagrammatic representation below illustrates the working-up and recovery of PET waste materials according to the process of the invention. The diagram includes the individual process steps of: production—distribution—collection—comminution—working-up—melting post-condensation—granulating—new raw material. These preferred process steps are hereinafter described.

The description is merely representative of the processes within the spirit and scope of the invention and is not intended to unduly limit the scope of the invention.

1. Production

This step involves the production of the original polyesters, which are processed and are subjected to reclamation after use. Since the specific product properties, such as mechanical strength and clearness, are imparted both to fibers and to biaxially oriented PET films by stretching and crystallizing, i.e., by appropriate purifying treatments, it is in general sufficient to employ, as starting material, polyesters such as are obtained following the polycondensation step, and which preferably have a molecular weight, expressed in terms of specific viscosity (SV), of 600 to 800. The SV value is determined by means of the following measuring method, using the viscosity of a 1% solution of PET in dichloroacetic acid, at 25° C.:

$$SV = \left( \frac{\text{mean running-through time of solution}}{\text{mean running-through time of solvent}} - 1 \right) \times 1000$$

The viscosity of the polymer raw materials is, inter alia, indicated as reduced specific viscosity (RSV). It is measured according to DIN 53728, Sheet 3.

Biaxially oriented polyester films can also be reclaimed. In general such films have a RSV value of between 0.65 dl/g (SV about 790) and 0.80 dl/g (SV about 1,000), whereby high RSV values are achieved if the polymer raw material is dried well in vacuo prior to being processed into a film. This reduces the chain degradation of the polyester by hydrolysis during the processing into film. Care should also be taken that no substantial polymer chain degradation takes place due to excessive shearing forces which may arise during extrusion.

If the polyester is processed to give films having a low degree of orientation, or crystallized but unoriented PET films or containers, or amorphous PET films, the required high mechanical strength values must be achieved via a high molecular weight or SV values of between 1,000 and 1,200 (RSV =0.8 to 0.95 dl/g), which necessitates a post-condensation step prior to use. Such PET can also be reclaimed according to the present invention.

2. Distribution

The PET product or products of other plastics are sold either directly to the consumers or to converters and processors where the products are printed, laminated, coated, molded, or filled, if containers, before being sold to the consumers.

3. Collection

Scrap and unsold PET material is collected by the converters and processors and returned to the producers as high-quality, sorted reclaim material. Processed and/or used articles which have been converted by printing, labeling, laminating, and similar measures, or waste material returned by the consumers, which in most cases is mixed with other types of plastics, have to be worked up, purified and sorted appropriately, before they can be reclaimed.

4. Comminution

It is generally preferred to transport, clean, and sort the waste material in the comminuted state. Accordingly, the waste material is first shredded and then cleaned. In special cases, for example when labels, lids or peel-off laminates have first to be removed from plastic containers, it is expedient not to shred the material until after the cleaning step.

5. Working-up

Sorted, substantially clean PET material, such as trimmings and film ends, can often be re-used in the production process directly, if certain impurities due to dust or specks and somewhat deteriorated optical and mechanical quality are acceptable. Mixed waste material which contains a relatively high amount of impurities and stems from various types of polyester requires a special treatment prior to the further process steps, such that a well-sorted, practically clean PET is obtained. Suitable treatment steps include:

Washing with water to remove dirt, washing with soda lye to remove paper labels, washing with hydrocarbon to remove adhesive layers and other coatings;

Sorting by means of cyclones, sedimentation, flotation, or electrostatic or magnetic separators;

Dissolution in solvents and fractionated precipitation.

Prior to the further processing, the residual materials obtained in this way are separated off. In those cases where non-removable residual polymers are present, e.g., in laminates, tests have to be performed in each particular case to find out whether the respective residues impair the further processing. If necessary, these residual polymers have to be separated off, too, by means of an appropriate treatment.

6. Melting

The worked-up, shredded PET scrap material is melted. Prior to the melting process, by which the worked-up PET material is subjected to considerable thermal strain, the material preferably is dried, for example, in vacuo, in order to prevent or at least to minimize a possible chain degradation of the polyester due to hydrolysis during the further processing. The shredded material is melted and freed by filtering from impurities down to a particle size of 5 to 10 $\mu$m.

7. Post-Condensation and Granulating

The filtered melt is either post-condensed in the molten state or is first solidified and then granulated for a subsequent solid phase post-condensation.

The melt post-condensation is preferably performed continuously in a devolatizer equipped with a cage agitator, at a temperature above the melting point of PET, in the range of 270° to 310° C., preferably of about 280° to 295° C. In the course of the melt postcondensation the molecular weight of the filtered melt is increased by 12 to 150% compared to the initial molecular weight of the filtered melt. Preferably a vacuum of 0.5 to 5 mbar is applied, and the dwell time of the melt in the devolatizer is 1 to 4 hours. The conditions are selected depending on the desired increase in the molecular weight, expressed in terms of the SV value. For example, a reduced pressure of 1.5 to 2 mbar and a treatment time of 0.5 to 1.5 hours at 280 to 295° C have to be selected for increasing the SV value from about 800 to 1050, and a reduced pressure of 3 to 5 mbar and a dwell time of 1 to 2 hours have to be selected for increasing the SV value from about 800 to 950. The granulated melt post-condensate is preferably fed into an extruder and extruded together with the virgin raw material to give cast films or other cast or molded articles.

If the filtered melt is first granulated and then subjected to a solid phase post-condensation, granules of relatively uniform size and shape are required, since the post-condensation is achieved via a diffusion process and is appropriately controlled. If the shape and size of the granules differ strongly, the molecular weight of the product obtained as a result of the solid phase postcondensation varies within a wide range.

The solid phase post-condensation is, for example, carried out continuously in a fluidized bed apparatus, employing an inert gas, such as nitrogen, as flushing gas and heat transfer agent. For increasing the SV value from about 800 to 1050, the temperature is adjusted to 210° to 230° C., and the dwell time is about 8 hours.

It is also possible to run the solid phase postcondensation discontinuously in a tumbler drier. A reduced pressure of about 0.1 mbar is then applied, and the reaction time is about 12 hours. The temperature is in the range of 225° to 235° C., and the SV value is increased from about 800 to 1050. A discontinuous solid phase condensation is particularly recommended in cases where the plastics material to be reclaimed has strongly differing initial property values and is present in varying amounts. Due to the high variability of the discontinuous solid phase condensation, this process is particularly advantageous if waste materials having varying molecular weights, pigment and other additives are to be treated. Generally, solid phase condensation is preferred if a reduced content of oligomers, acetaldehyde, terminal carboxyl groups as well as a high clearness of the reclaimed material are desired.

8. New Raw Material

Depending on the operation conditions selected for the post-condensation, the reclaimed plastic material can be used for the following applications:

| Waste material from | Old SV Value | New SV value | Use |
| --- | --- | --- | --- |
| BOPET films | 600–800 | 700–900 | Improved blend quality, because viscosity is adapted to virgin raw material |
| BOPET films | 600–800 | 950–1100 | Use of BOPET scrap for APET films |
| BOPET films | 600–800 | 1100–1250 | Use of BOPET scrap for CPET films |
| APET films | 900–1100 | 1000–1100 | Improved blend quality, since viscosity and properties are adapted to virgin raw material |
| PET containers | 900–1100 | 1000–1100 | |

BOPET film = biaxially oriented PET film
APET film = amorphous PET film
CPET film = crystallized, but unoriented PET film If the reclaimed material need only meet low quality standards, it is possible to add up to 80% of noncondensed amorphous PET material to the virgin raw material used for the base layer of a coextruded film and to cover this base layer with thin top layers of virgin raw material in order to improve the appearance. Since, however, the viscosity of the top layers must be inferior to the viscosity of the base layer, the mechanical properties of films prepared in this way are considerably worse than those of films where reclaimed, post-condensed plastics material according to the invention is added to the virgin raw material of the base layer. Accordingly, the process of the invention provides a post-condensed polyester useful with virgin polyester to produce a film of superior properties.

What is claimed is:

1. A process for reclaiming thermally strained polyester waste materials comprising the steps of:
   a) shredding a mixture of polyester waste materials, said mixture comprising polyesters of different molecular weights and different degrees of conversion, so as to form a shredded polyester mixture,
   b) melting said shredded mixture so as to form a molten material,
   c) filtering said molten material down to a particle size of about 5 to 10 microns, by removing those impurities having a particle size of equal to about 5 to 10 microns and removing those impurities having a size of greater than 5 to 10 microns, so as to produce a filtered melt,
   d) increasing by about 12 to about 150% as compared to the initial molecular weight of said filtered melt, the average molecular weight of said polyesters, by post-condensation, so as to produce a condensed mixture, and
   e) recovering said condensed mixture.

2. A process of claim 1, wherein said post-condensation comprises liquid-phase post-condensation.

3. A process of claim 2, additionally comprising the step of:
   f) feeding said recovered mixture to an extreuder and extruding it together with virgin polyester so as to produce an extruded article.

4. A process of claim 1, wherein said mixture of polyester waste materials comprises polyesters selected from the group consisting of polyethylene terephthalate, polytetramethylene terephthalate, poly-1,4-cyclohexylenedimethyl terephthalate, polyethylene-2,6-naphthalate, and mixtures thereof.

5. A process of claim 4, wherein said mixture of polyester waste materials consists essentially of a clean mixture of said polyesters, comprising essentially no labels, lids, coatings, dirt, adhesives, or polymers other than said polyesters.

6. A process of claim 4, wherein said mixture of polyester waste materials consists essentially of a mixture of polyethylene terephthalate polyesters 7. A process of claim 1, wherein the specific viscosity of the polyesters employed in step a) is from about 600 to about 1100.

8. A process of claim 1, wherein said step d) is performed continuously with agitation and degassing at a reduced pressure and a temperature above the melting point of said polyesters.

9. A process of claim 8, wherein said temperature is about 270 to about 310° C., wherein said pressure is about 0.5 to about 5 mbar and said step c) occurs continuously over a period of about 0.5 to about 4 hours.

10. A process of claim 9, wherein said mixture of polyester waste materials consists essentially of polyethylene terephthalate, wherein said temperature is about 280 to about 295° C., said pressure is about 1.5 to about 2 mbar, and said step d) is performed continuously over a period of about 0.5 to about 1.5 hours, wherein the specific viscosity of said polyethylene terephthalate is increased from about 800 to about 1050 during said step d).

11. A process of claim 9, wherein said mixture of polyester waste materials consists essentially of polyethylene terephthalate, wherein said temperature is about 280° to about 295° C., said pressure is about 3 to about 5 mbar, and said step d) is performed continuously over a period of about 1 to about 2 hours, wherein the specific viscosity of said polyethylene terephthalate is increased from about 800 to about 950 during said step d).

12. A process of claim 1 additionally comprising between steps c) and d) the steps of:
   i) solidifying said filtered melt, so as to produce a solidified mixture,
   ii) granulating said solidified mixture so as to produce a granulated mixture, and
   iii) increasing by about 30 to 150%, as compared to the initial molecular weight of said granulated mixture, the average molecular weight of said granulated mixture.

13. A process of claim 12, additionally comprising the step of:
   f) feeding said granulated mixture to an extruder and extruding it together with virgin polyester so as to produce an extruded article.

14. A process of claim 12, wherein said mixture of polyester waste materials comprises polyesters selected from the group consisting of polyethylene terephthalate, polytetramethylene terephthalate, poly-1,4-cyclohexylenedimethyl terephthalate, polyethylene-2,6-naphthalate, and mixtures thereof.

15. A process of claim 14, wherein said mixture of polyester waste materials consists essentially of a clean mixture of said polyesters, comprising essentially no labels, lids, coatings, dirt, adhesives, or polymers other than said polyesters.

16. A process of claim 15, wherein said mixture of polyester waste materials consists essentially of a mixture of polyethylene terephthalate polyesters.

17. A process of claim 14, wherein the specific viscosity of said mixture of polyester waste materials is from about 600 to about 1100.

18. A process of claim 12, wherein said granulated mixture comprises granules of relative uniform size and shape.

19. A process of claim 12, wherein said step d) is performed continuously in a fluidized bed apparatus, using inert gases as heat transfer agents and flushing gases.

20. A process of claim 19, wherein said inert gases comprise nitrogen.

21. A process of claim 19, wherein said polyester waste material consists essentially of polyethylene terephthalate, and during step d), the temperature is about 200° to about 250° C., and the treatment time is about 8 hours so as to increase the specific viscosity of said polyethylene terephthalate from about 800 to about 1050.

22. A process of claim 12, wherein said polyester waste material consists essentially of polyethylene terephthalate, wherein step d) is performed discontinuously, at a reduced pressure of about 0.1 mbar, over a period of about 12 hours, so as to increase the specific viscosity of said polyethylene terephthalate from about 800 to about 1050.

23. A process of claim 22, wherein step d) is performed in a tumbler drier at a temperature of about 200 to about 250° C.

24. A process of claim 12, wherein said postcondensation comprises solid phase postcondensation so as to produce a condensed, granulated mixture.

* * * * *